United States Patent
Matsuno

(10) Patent No.: US 8,862,707 B2
(45) Date of Patent: Oct. 14, 2014

(54) METHOD AND APPARATUS FOR MANAGING DATA OF OPERATION SYSTEM

(75) Inventor: Akinori Matsuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 13/200,711

(22) Filed: Sep. 29, 2011

(65) Prior Publication Data
US 2012/0030323 A1   Feb. 2, 2012

Related U.S. Application Data

(63) Continuation of application No. PCT/JP2009/056529, filed on Mar. 30, 2009.

(51) Int. Cl.
*G06F 15/177* (2006.01)
*G06F 15/173* (2006.01)

(52) U.S. Cl.
USPC .......................................... 709/221; 709/224

(58) Field of Classification Search
USPC .......................................................... 709/221
See application file for complete search history.

(56) References Cited

U.S. PATENT DOCUMENTS

| | | | |
|---|---|---|---|
| 2006/0227367 A1 | 10/2006 | Kitada | |
| 2009/0222498 A1* | 9/2009 | Lu et al. | 707/204 |
| 2010/0153781 A1* | 6/2010 | Hanna | 714/37 |

FOREIGN PATENT DOCUMENTS

| | | |
|---|---|---|
| JP | 8-79246 | 3/1996 |
| JP | 11-168559 | 6/1999 |
| JP | 2000-215074 | 8/2000 |
| JP | 2000-324121 | 11/2000 |
| JP | 2006-107074 | 4/2006 |
| JP | 2006-113840 | 4/2006 |
| JP | 2008-538242 | 10/2008 |

OTHER PUBLICATIONS

International Search Report for PCT/JP2009/056529, mailed Jun. 16, 2009.

* cited by examiner

*Primary Examiner* — John B. Walsh
(74) *Attorney, Agent, or Firm* — Staas & Halsey LLP

(57) ABSTRACT

A server for an operation system includes a monitor to monitor a status of another server, a first storage to retain a first network configuration information, a second storage to copy the first network configuration information when an abnormality is detected in the another server, a third storage to retain a first update history information including update information of a network configuration information obtained from a client in the operation system, and an operation configuration manager to update the first network configuration information and a second network configuration information retained in the another server when the another server recovers from the abnormality. The operation configuration manager is configured to update the first network configuration information and the second network configuration information based on the first update history information and a second update history information retained in the another server.

10 Claims, 18 Drawing Sheets

FIG.5

(STATION INFORMATION)

| STATION ID | STATION NAME |
|---|---|
| 1 | TOKYO STATION |
| 2 | OSAKA STATION |
| 3 | NAGOYA STATION |

(NE INFORMATION)

| NE ID | APPARATUS NAME | STATION ID | APPARATUS TYPE |
|---|---|---|---|
| 1 | TRANSMISSION APPARATUS#1 | 1 | WDM Type1 |
| 2 | TRANSMISSION APPARATUS#2 | 1 | WDM Type1 |
| 3 | TRANSMISSION APPARATUS#3 | 2 | ADM Type1 |
| 4 | TRANSMISSION APPARATUS#4 | 2 | ADM Type2 |
| 5 | TRANSMISSION APPARATUS#5 | 2 | IP Type1 |

(NETWORK INFORMATION)

| NETWORK ID | NETWORK NAME |
|---|---|
| 1 | TOKAIDO |

(NETWORK INSIDE APPARATUS INFORMATION)

| NETWORK ID | NE ID |
|---|---|
| 1 | 1 |
| 1 | 2 |
| 1 | 3 |
| 1 | 4 |
| 1 | 5 |

(NE INSIDE PKG INFORMATION)

| NE ID | SLOT POSITION | PKG TYPE | USAGE STATUS |
|---|---|---|---|
| 1 | LIU-1 | GbE | USED |
| 1 | LIU-2 | 10G | USED |
| 1 | LIU-3 | 10G | UNUSED |
| ⋮ | ⋮ | ⋮ | ⋮ |
| 5 | LIU-10 | FE | USED |

FIG.6

(JOURNAL DATA)

| NE ID | LOCATION | OCCUR/RECOVER | ALARM TYPE | TIME OF OCCURRENCE |
|---|---|---|---|---|
| 1 | LIU-1 | OCCUR | RMBD | 2009/01/01 10:00:55 |
| 1 | LIU-4-1 | OCCUR | LOS | 2009/01/01 19:05:30 |
| 3 | LIU-2-1 | OCCUR | SW | 2009/01/02 03:45:10 |
| 3 | LIU-2-1 | RECOVER | SW | 2009/01/02 04:15:03 |
| 5 | NE | EVENT | COLD START | 2009/01/05 09:10:17 |

(ALARM INFORMATION DURING OCCURRENCE)

| NE ID | LOCATION | ALARM TYPE | TIME OF OCCURRENCE |
|---|---|---|---|
| 1 | LIU-1 | RMBD | 2009/01/01 10:00:55 |
| 1 | LIU-4-1 | LOS | 2009/01/01 19:05:30 |

(ALARM HISTORY INFORMATION)

| NE ID | LOCATION | ALARM TYPE | TIME OF OCCURRENCE |
|---|---|---|---|
| 3 | LIU-2-1 | SW | 2009/01/02 03:45:10 |

(SYSTEM INFORMATION)

| LOCATION | TYPE | TIME OF OCCURRENCE |
|---|---|---|
| SYSTEM | SWITCH OPERATION | 2009/01/01 10:00:55 |
| SERVER | EXECUTE DB BACKUP | 2009/01/01 19:05:30 |

FIG.7

(STATION INFORMATION)

| STATION ID | STATION NAME |
|---|---|
| 1 | TOKYO STATION |
| 2 | OSAKA STATION |
| 3 | NAGOYA STATION |

(NE INFORMATION)

| NE ID | APPARATUS NAME | STATION ID | APPARATUS TYPE |
|---|---|---|---|
| 1 | TRANSMISSION APPARATUS#1 | 1 | WDM Type1 |
| 2 | TRANSMISSION APPARATUS#2 | 1 | WDM Type1 |
| 3 | TRANSMISSION APPARATUS#3 | 2 | ADM Type1 |
| 4 | TRANSMISSION APPARATUS#4 | 2 | ADM Type2 |
| 5 | TRANSMISSION APPARATUS#5 | 2 | IP Type1 |

(NETWORK INFORMATION)

| NETWORK ID | NETWORK NAME |
|---|---|
| 1 | TOKAIDO |

(NETWORK INSIDE APPARATUS INFORMATION)

| NETWORK ID | NE ID |
|---|---|
| 1 | 1 |
| 1 | 2 |
| 1 | 3 |
| 1 | 4 |
| 1 | 5 |

(NE INSIDE PKG INFORMATION)

| NE ID | SLOT POSITION | PKG TYPE | USAGE STATUS |
|---|---|---|---|
| 1 | LIU-1 | GbE | USED |
| 1 | LIU-2 | 10G | USED |
| 1 | LIU-3 | 10G | UNUSED |
| ⋮ | | | |
| 5 | LIU-10 | FE | USED |

FIG.8

| UPDATE INFORMATION | EXECUTION TIME |
|---|---|
| Insert into ne_info (6,transmission apparatus#6,2,IP Type2); | 2009/01/01 10:00:55 |
| Update network set network name='toukaidou'; | 2009/01/01 19:05:30 |

FIG.9

| MAIN SERVER /AUXILIARY SERVER | ACTIVE SERVER /INACTIVE SERVER | DB | NORMAL/ ABNORMAL/ SWITCHING |
|---|---|---|---|
| MAIN SERVER | ACTIVE SERVER | Master | NORMAL |

FIG.10

| UPDATE INFORMATION | EXECUTION TIME |
|---|---|
| Insert into ne_info (6,transmission apparatus#6,2,IP Type2); | 2009/01/01 10:00:55 |
| Update network set network name='toukaidou'; | 2009/01/01 19:05:30 |

FIG.11

| UPDATE INFORMATION | EXECUTION TIME |
|---|---|
| Update network set network name='toumei'; | 2009/01/02 01:05:30 |

FIG.12

| UPDATE INFORMATION | EXECUTION TIME |
|---|---|
| Insert into ne_info (6,transmission apparatus#6,2,IP Type2); | 2009/01/01 10:00:55 |
| Update network set network name='toukaidou'; | 2009/01/01 19:05:30 |
| Update network set network name='toumei'; | 2009/01/02 01:05:30 |

FIG.15
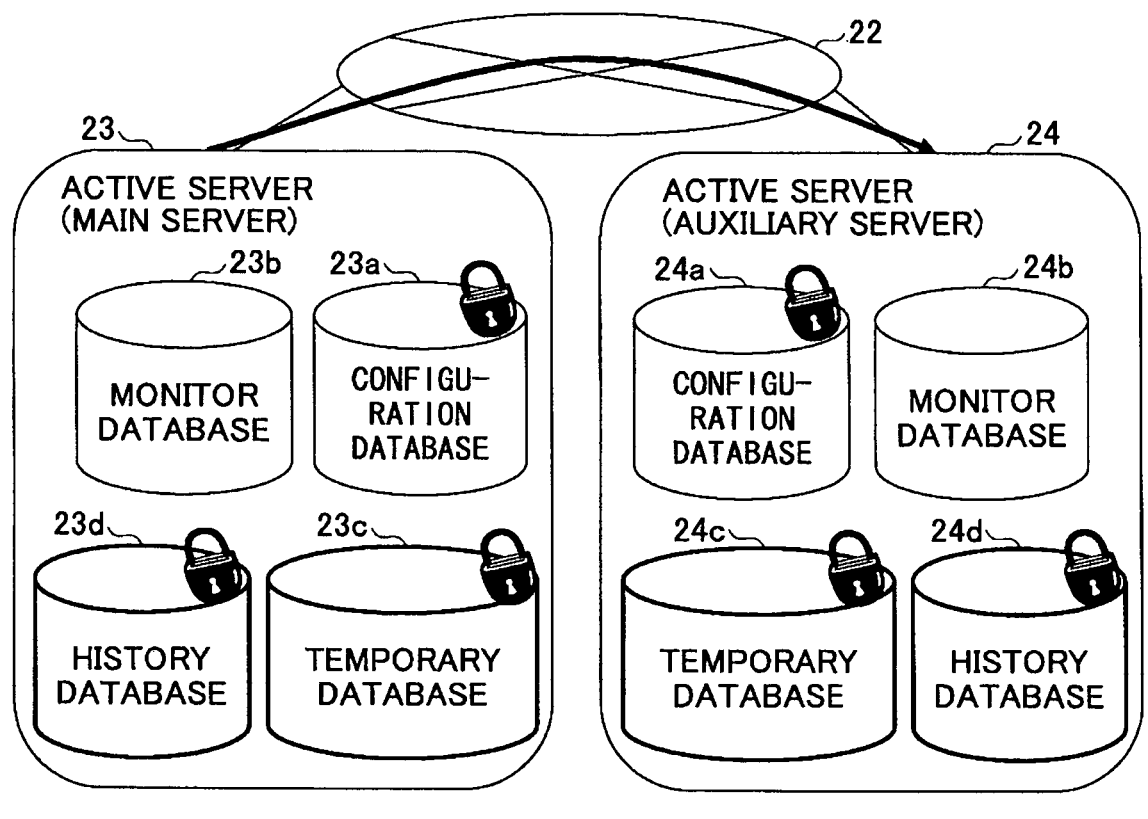
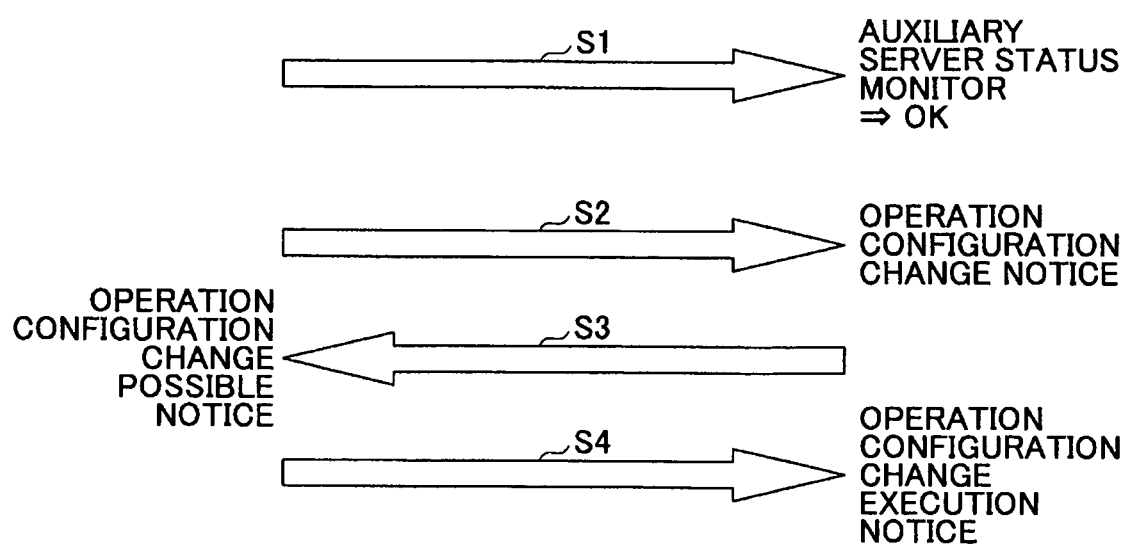

FIG.16
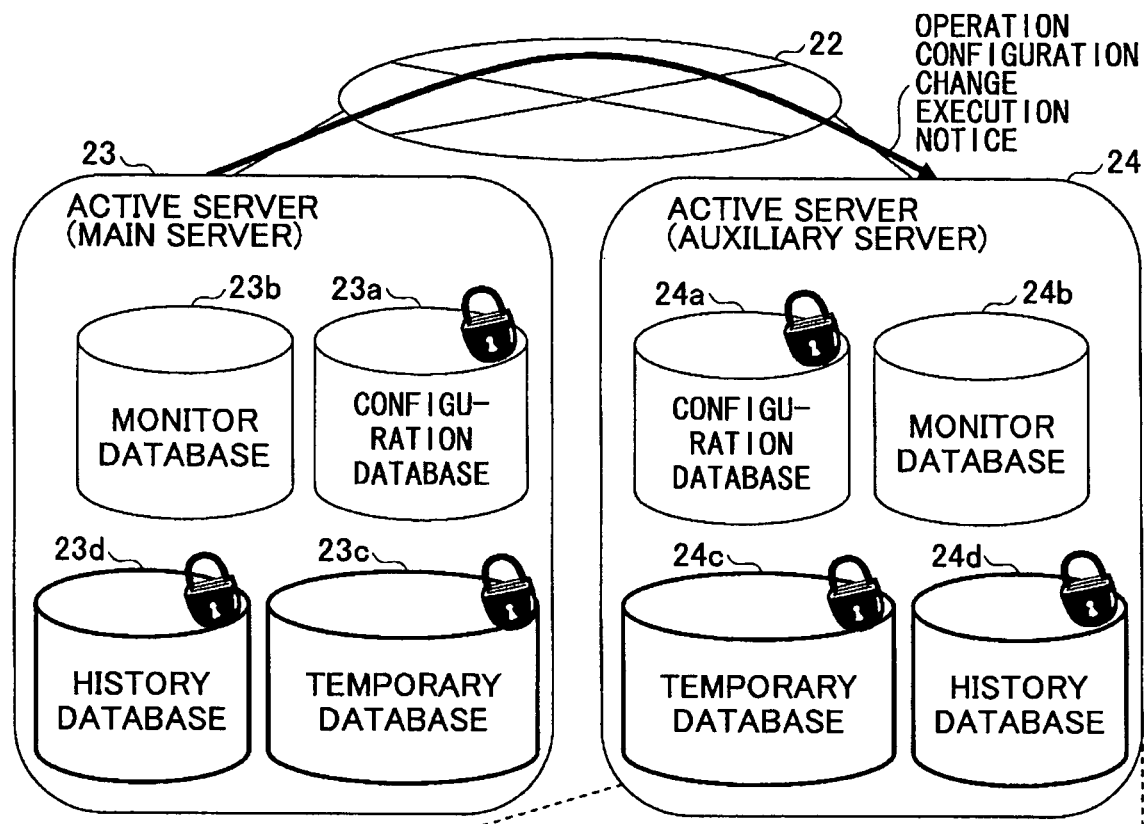
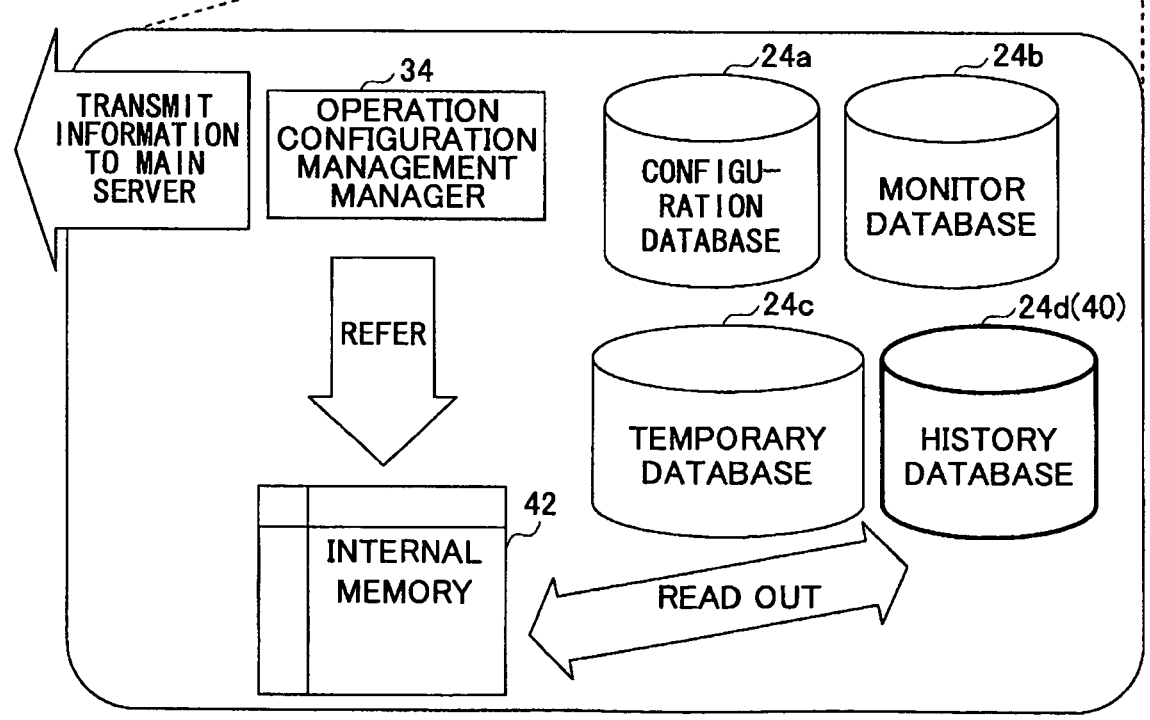

FIG.17
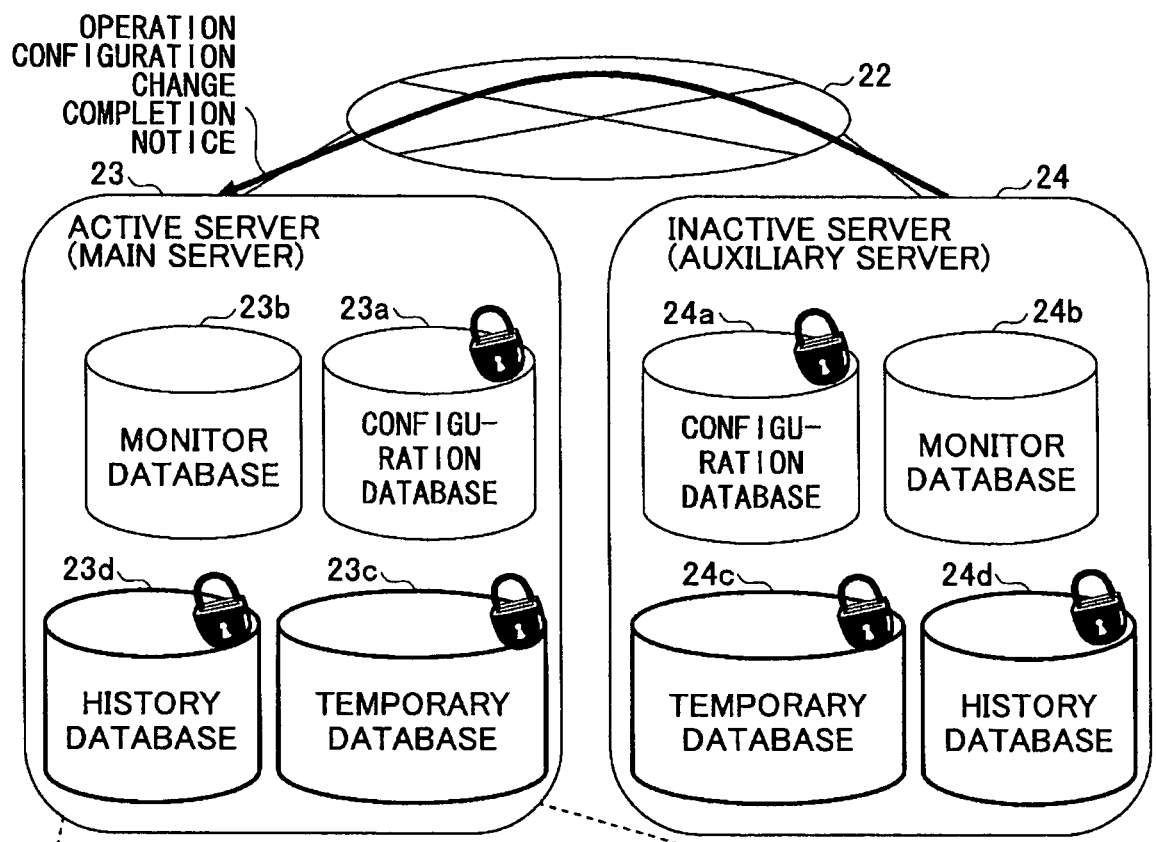
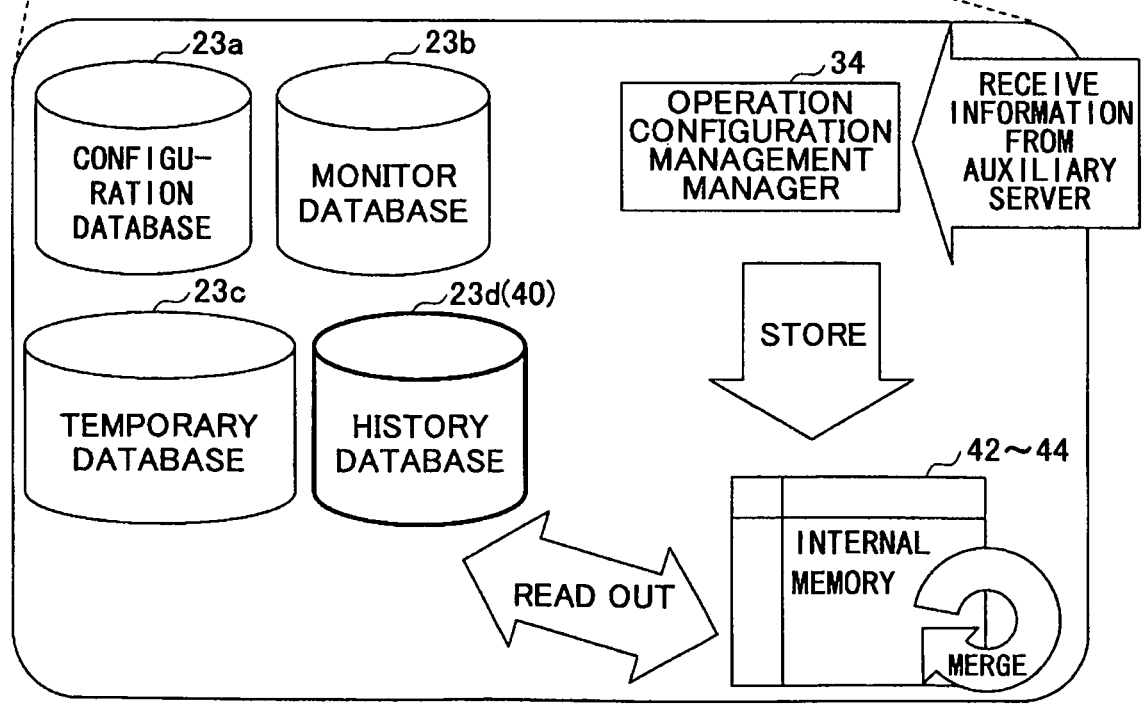

METHOD AND APPARATUS FOR MANAGING DATA OF OPERATION SYSTEM

CROSS-REFERENCE TO RELATED APPLICATIONS

This application is a U.S. continuation application filed under 35 USC 111(a) claiming benefit under 35 USC 120 and 365(c) of PCT application JP2009/056529, filed Mar. 30, 2009. The foregoing application is hereby incorporated herein by reference.

FIELD

The embodiments discussed herein are related to an operation system including plural clients and main and auxiliary servers, and a method for managing data of an operation system that monitors and controls a transmission apparatus of a network.

BACKGROUND

FIG. 1 is a schematic diagram illustrating an example of a hot standby dual monitor Operation System (OpS) 10 according to a related art example.

As illustrated in FIG. 1, the operation system 10 includes clients 11-1 to 11-m of a client system for receiving a service request (e.g., monitor request, control request) from an operator and main and auxiliary servers 13, 14 of a server system, being connected to corresponding clients via a monitor network 12, for executing input service requests.

The servers 13, 14 and transmission apparatuses (NE: Network Element) 16-1 to 16-n are connected to each other via a monitor network 15. The transmission apparatuses (NE: Network Element) 16-1 to 16-n are subject to monitoring and control by the servers 13, 14. The network elements 16-1 to 16n constitute a network that transmits/receives main signals.

As a countermeasure against a disaster, the hot standby dual monitor operation system uses multisites in which the main server 13 and the auxiliary server 14 are allocated at distant locations. In order to maintain operability even during maintenance of the servers 13, 14 or a case where a failure occurs in one of the dual system, the main and auxiliary servers 13, 14 include a configuration database 13a, 14a and a monitor data base 13b, 14b, respectively. Thereby, the servers 13, 14 are operable 24 hours a day and 365 days a year.

The configuration database 13a, 14a use a multi-master replication function for synchronizing data of the main server 13 and data of the auxiliary server 14. In order to achieve dual monitoring, data is managed by the monitor databases 13b, 14b of the servers 13, 14. Since dual monitoring is performed where monitoring is performed separately (independently) by the main and auxiliary servers 13, 14, alarm data such as TRAP is redundantly managed and an alarm (e.g., an alarm of the monitor network 15 or an alarm of the network elements 16-1 to 16-n) is prevented from being undetected to a maximal degree. Thus, monitoring performance is improved.

There is known a technology of a duplex communication control system including communication control apparatuses A, B of active and standby servers, duplicated shared (common) disk apparatuses ca, cb, and internal disk apparatuses ia, ib provided inside the communication control apparatuses A, B (see, for example, Japanese Laid-Open Patent Publication No. 2006-107074). With the technology, among service data stored in the shared disk apparatuses ca, cb, only service requisite data is stored into the internal disk apparatuses ia, ib, so that the communication control apparatus A of the active system can use the service requisite data stored in the internal disk apparatus is during a failure.

Further, there is known a technology of an automatic failure recovery communication system including a process control part for controlling all processes of the system (see, for example, Japanese Laid-Open Patent Publication No. 2000-215074). The system is provided with an original process having operation management programs for system operation and system management and a clone process having necessary irreducible operation management programs among the operation management programs of the original process in which periodic communications are performed between the original process and the clone process.

Further, there is known a technology of a decentralized type communication system including plural communication process servers for performing a set of communication processes, a log server including a dual disk for storing process log data of each of the communication process servers, and a monitor server for monitoring the communication process servers and the log server and performing restart control when a failure occurs (see, for example, Japanese Laid-Open Patent Publication No. 8-79246).

Further, there is known a technology of an image process system server including a backup server in which the performing of processes and operations is switched to the backup server when detecting that a main server is inoperable (see, for example, Japanese National Publication of International Patent Application No. 2008-538242).

In order to maintain the order for executing update transactions of the configuration database in the hot standby dual monitor operation system, the updating of the configuration database is allowed to be performed by the active system (main server or auxiliary server) alone. Then, by transmitting a query to the inactive (standby) server (auxiliary server or main server) with a replication function, synchronization between the data of the configuration database of the active server and the data of the configuration database of the inactive server can be performed.

In a case where there is a failure in the active server 13 or a case where the inactive server 14 cannot be accessed due to, for example, hardware failure or application defects as illustrated in FIG. 2, the inactive server cannot switch to an active server until there is confirmation that all of the update transactions of the active server 13 have been transmitted to the inactive server 14. This is to ensure consistency between the configuration databases 13a, 14a and to prevent a deadlock of data from occurring.

Accordingly, by preventing the inactive server from performing a process of registering data or a process of controlling the transmission apparatus along with the updating of the configuration database (single system operation), consistency between configuration databases can be ensured. This, however, leads to a problem where the user is compelled to use a system in which the inactive server is only allowed to perform a monitoring process.

SUMMARY

According to an aspect of the invention, there is provided a server for an operation system including a monitor to monitor a status of another server, a first storage to retain a first network configuration information, a second storage to copy the first network configuration information when an abnormality is detected in the another server, a third storage to retain a first update history information including update information of a network configuration information obtained from a client in the operation system, and an operation configuration manager to update the first network configuration information and a second network configuration information retained in the another server when the another server recovers from the abnormality. The operation configuration manager is configured to update the first network configuration information and the second network configuration information based on the first update history information and a second update history information retained in the another server.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 5 is a schematic diagram illustrating an example of a configuration database according to an embodiment of the present invention;

FIG. 6 is a schematic diagram illustrating an example of a monitor database according to an embodiment of the present invention;

FIG. 7 is a schematic diagram illustrating an exemplary configuration of a temporary database according to an embodiment of the present invention;

FIG. 8 is a schematic diagram illustrating an exemplary configuration of a history database according to an embodiment of the present invention;

FIG. 9 is a schematic diagram illustrating an exemplary configuration of an operation configuration management memory according to an embodiment of the present invention;

FIG. 10 is a schematic diagram illustrating an exemplary configuration of an update history management memory according to an embodiment of the present invention;

FIG. 11 is a schematic diagram illustrating an exemplary configuration of an other server update history management memory according to an embodiment of the present invention;

FIG. 12 is a schematic diagram illustrating an exemplary configuration of an update history consistency memory according to an embodiment of the present invention;

FIGS. 15-18 are schematic diagrams for describing an operation when a monitor network recovers from a failure according to an embodiment of the present invention.

DESCRIPTION OF EMBODIMENTS

Embodiments of the present invention are described with reference to the drawings.

<Configuration Of Operation System (OpS)>

Figure 1:
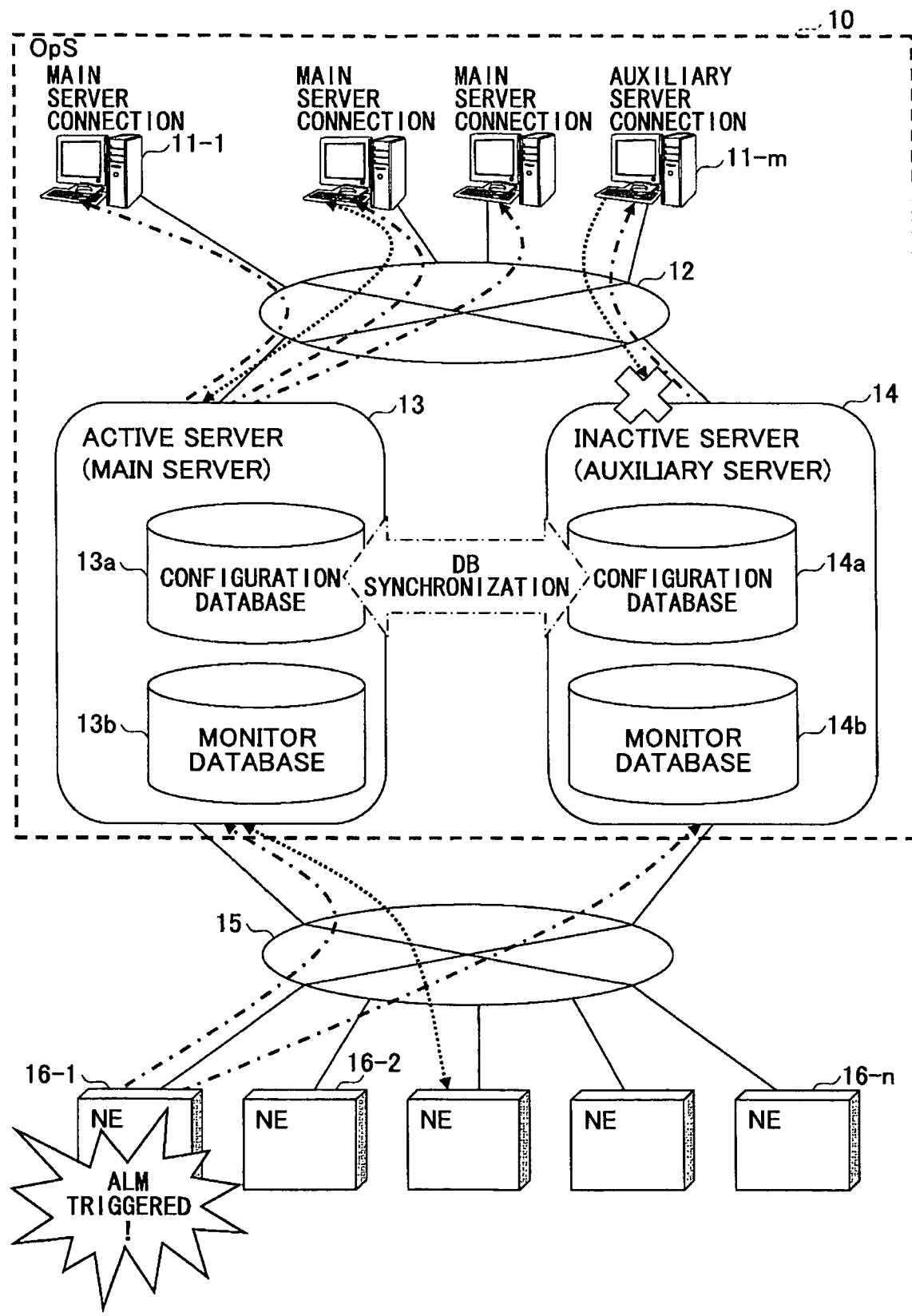
FIG. 1 is a schematic diagram illustrating an exemplary configuration of an operation system (OpS) according to a related art example.
Figure 2:
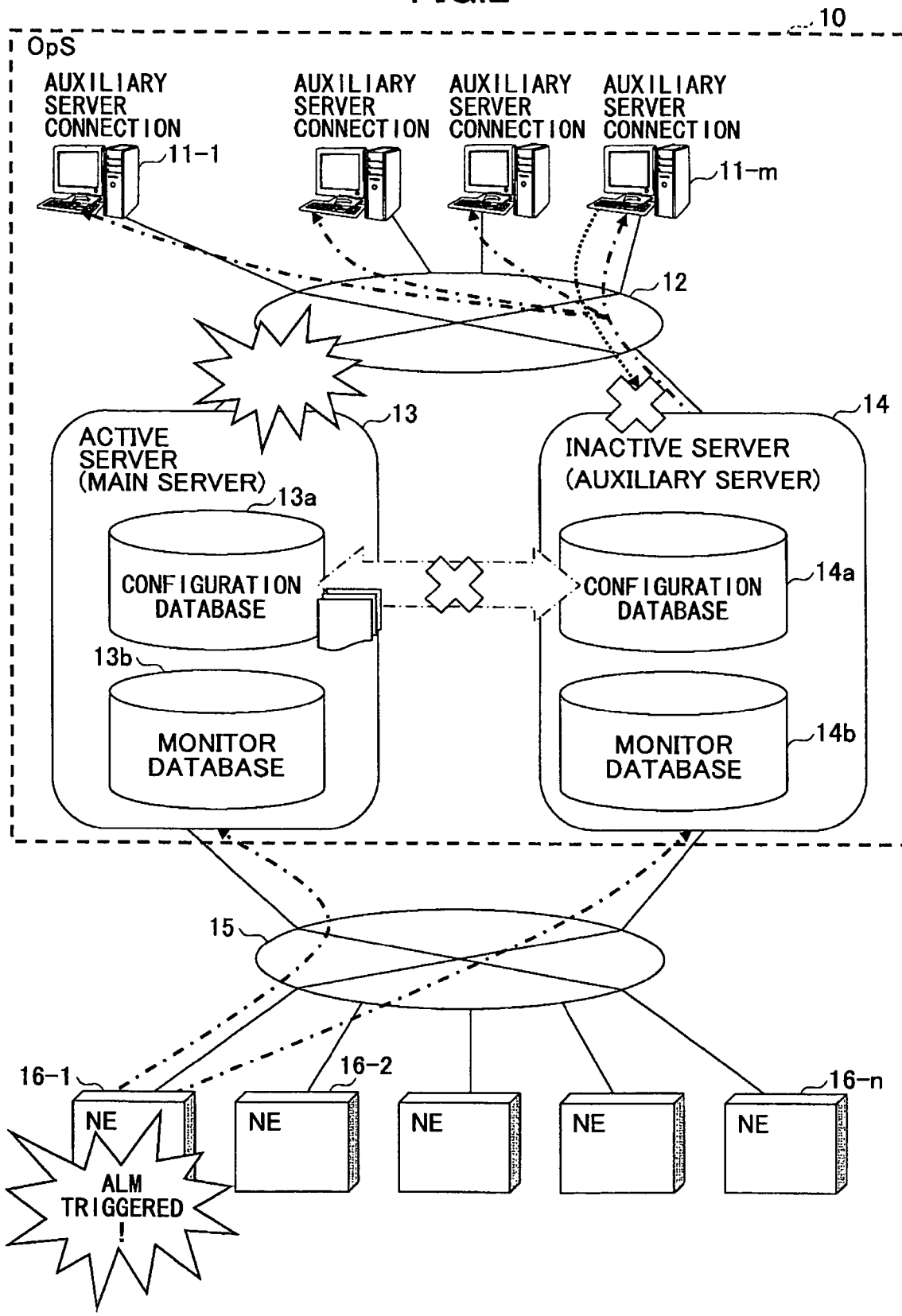
FIG. 2 is a schematic diagram for description an operation during a failure of an operation system according to a related art example.
Figure 3:
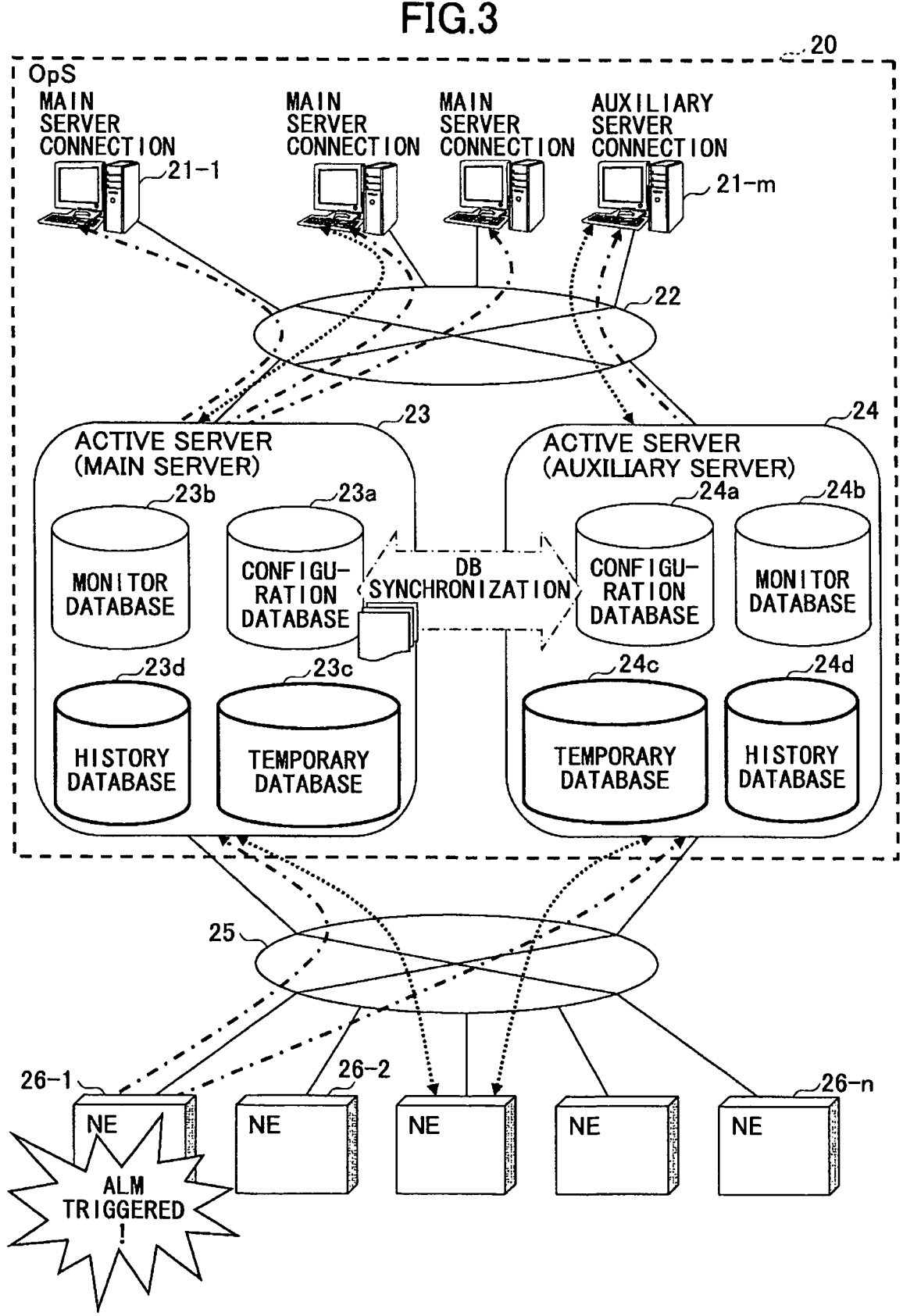
FIG. 3 is a schematic diagram illustrating an exemplary configuration of a hot standby dual monitor operation system according to an embodiment of the present invention.

FIG. 3 is a schematic diagram illustrating an exemplary configuration of a hot standby dual monitor operation system (hereinafter also simply referred to as "operation system") 20 according to an embodiment of the present invention. In FIG. 3, the operation system 20 includes clients 21-1 to 21-m of a client system for receiving a service request(s) from an operator requesting, for example, a monitor process or a control process. The operation system 20 also includes a main server 23 and an auxiliary server 24 that are connected to the clients 21-1 to 21-m via a monitor network 22 and execute the service requests input from the clients 21-1 to 21-m.

The main and auxiliary servers 23, 24 and transmission apparatuses (NE: Network Element) 26-1 to 26-n are connected to each other via a monitor network 25. The transmission apparatuses (NE: Network Element) 16-1 to 16-n are subject to monitoring and control by the main and auxiliary servers 23, 24. The network elements 26-1 to 26-n constitute a network that transmits/receives main signals.

As a countermeasure against a disaster, the operation system 20 uses multisites in which the main server 23 and the auxiliary server 24 are allocated at distant locations. In order to maintain operability even during maintenance of the main and auxiliary servers 23, 24 or a case where a failure occurs in one of the dual systems, the main and auxiliary servers 23, 24 include a configuration database 23a, 24a and a monitor database 23b, 24b, a temporary database 23c, 24c, and a history database 23d, 24d, respectively. Thereby, the main and auxiliary servers 23, 24 are operable 24 hours a day and 365 days a year.

The configuration databases 23a, 24a use a multi-master replication function for synchronizing data between the main server 23 and the auxiliary server 24. In order to achieve dual monitoring, data is managed by the monitor databases 23b, 24b of the main and auxiliary servers 23, 24. Since dual monitoring is performed where monitoring is performed separately (independently) by the main and auxiliary servers 23, 24, alarm data such as TRAP is redundantly managed and an alarm (e.g., an alarm of the monitor network 25 or an alarm of the network elements 26-1 to 26-n) is prevented from being undetected to a maximal degree. Thus, monitoring performance is improved.

The basic mechanism of the operation system 20 includes the following five aspects. The system 20 has a hot standby redundant configuration. The system 20 performs dual monitoring (each of the main and auxiliary servers 23, 24 performs monitoring). The configuration databases 23a, 24a perform synchronization with each other by using multi-master replication. Changes of the configuration databases 23a, 24a can be made only from an active system. By switching between active and inactive, an auxiliary server can become an active server or an inactive (standby) server. Operations of the system 20 can be performed by a single server according to an embodiment of the present invention.

<Block Diagram of Functions of Server>

Figure 4:
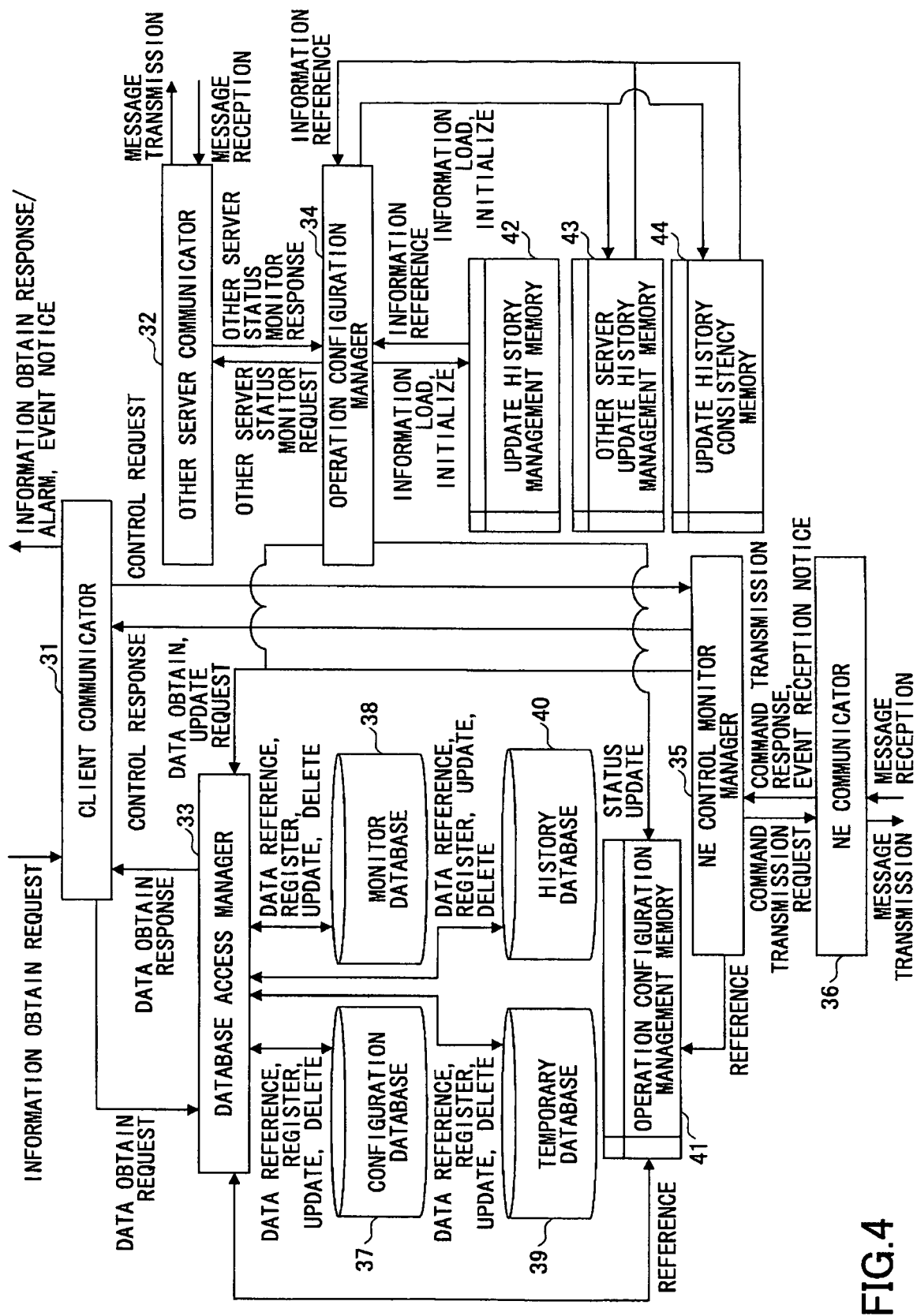
FIG. 4 is a block diagram illustrating functions of a server according to an embodiment of the present invention.

FIG. 4 is a block diagram illustrating functions of a server according to an embodiment of the present invention. The server illustrated in FIG. 4 may be the main server 23, or the auxiliary server 24. In addition, each function of the belowdescribed database access manager 33, operation configuration manager 34, and NE control monitor manager 35 may be executed by a processor (not illustrated) of the server of FIG. 4 in accordance with a program according to an embodiment of the present invention. In FIG. 4, a client communicator 31 is for communicating with a client. The client communicator 31 receives a request from the client, obtains data corresponding to the request via a database access manager 33, and responds to the client. Further, the client communicator 31 also sends an alarm or a system event report to the client.

An other server communicator 32 is for communicating with another server (i.e. a server besides itself). The other server communicator 32 receives a request (e.g., other server status monitor request, active status change notification request) from an operation configuration manager 34 and transmits a status monitor report to the other server. Further, the other server communicator 32 receives the report from the other server and sends the report to the operation configuration manager 34.

The database access manager 33 is for obtaining data from a database and updating the database. The database access manager 33 receives a request (e.g., data obtain request, update request) from the client communicator 31, the operation configuration manager 34, or an NE control monitor manager 35 and accesses a configuration database 37, a monitor database 38, a temporary database 39, and a history database 40 in accordance with the received request. The database access manager 33 accesses the databases 37, 38, 39, and 40 by referring to an operation configuration management memory 41 and determines the database to be accessed. Further, the database access manager 33 refers to the operation configuration management memory 41 and performs locking and initializing of the databases 37, 38, 39, and 40.

The operation configuration manager 34 is for managing an operation status of the server itself. Further, the operation configuration manager 34 is for monitoring the status of the other server. In a case where the operation configuration manager 34 detects that the other system server is abnormal, the operation configuration manager 34 changes the operation status and the database status that are stored inside the operation configuration management memory 41. In a case where the operation configuration manager 34 detects that the other system server is normal, the operation configuration manager 34 requests the other server communicator 32 to transmit, for example, an active configuration change notice. In a case of recovering a database, the operation configuration manager 34 loads the history database 40 to the update history management memory 42 via the database access manager 33.

Further, the operation configuration manager 34 performs a matching process between an update history data message received from the other server and the update history management memory 42, loads the matching results to the other server update history management memory 43, and updates the configuration database 37 via the database access manager 33.

The NE control monitor manager 35 is for communicating with and managing one or more transmission apparatuses (NE, Network Elements). The NE control monitor manager 35 is for receiving a control request from the client communicator 31 and sending a command transmission request to the NE communicator 36. When the NE control monitor manager 35 receives a control request from the client communicator 31, the NE control monitor manager 35 refers to the operation status (active/inactive status) of the operation configuration management memory 41. In a case where the operation state indicated in the operation configuration management memory 41 is active, the NE control monitor manager 35 sends a command transmission request to the NE communicator 36. In a case where the operation state indicated in the operation configuration management memory 41 is inactive (i.e. inactive system), the NE control monitor manager 35 sends a response to the NE communicator 36 reporting that no command can be transmitted to the NE control monitor manager 35. Further, in a case where the NE control monitor manager 35 receives a response to a command transmission request from the NE communicator 36, the NE control monitor manager 35 updates a database via the database access manager 33.

The NE communicator 36 is for communicating with the transmission apparatus (NE).

The NE communicator 36 receives a command transmission request from the NE control monitor manager 35 and transmits a message to the transmission apparatus. In a case where the transmission apparatus receives the message, the transmission apparatus sends a command transmission response (i.e. response to a command transmission request) or an event reception notice to the NE control monitor manager 35.

The configuration database 37 corresponds to the configuration database 23a, 24a illustrated in FIG. 3. The configuration database 37 retains information used by the operation system (e.g., station information, apparatus information, network information, NE inside configuration information) retained therein.

The monitor database 38 corresponds to the monitor database 23b, 24b illustrated in FIG. 3. The monitor database 38 has information pertaining to, for example, an NE managed in the operation system, an alarm triggered in the operation system, management of a journal of an event, management of a currently triggered alarm, and alarm history.

The temporary database 39 corresponds to the temporary database 23d, 24d illustrated in FIG. 3. The temporary database 39 has substantially the same configuration as the configuration database 37.

The temporary database 39 is not used in a normal operating situation. In a case where a redundant configuration of one of the servers is abnormal, the temporary database 39 is used instead of the configuration database 37.

The history database 40 corresponds to the history database 23d, 24d illustrated in FIG. 3. The history database 40 is for retaining the history of updating the information in the temporary database 39.

The operation configuration management memory 41 is an internal memory for retaining, for example, operation information of the server itself, status information of another system server, and operation status of a database.

The update history management memory 42 is an internal memory for loading information of the history database 40 provided in the server itself.

The other server update history management memory 43 is an internal memory for temporarily storing update history information received from another server.

The update history consistency memory 44 is an internal memory that is used for recovering the configuration database 37 back to a normal stage. The update history consistency memory 44 is used for loading information having the update history information in the update history management memory 42 and the update history information in the other server update history management memory 43 that are merged together.

<Configuration of Database>

FIG. 5 illustrates an example of the configuration database 37 according to an embodiment of the present invention. The configuration database 37 includes station information having a station ID (identifier) registered in correspondence with a station name. Further, the configuration database 37 includes transmission apparatus (NE) information having a transmission apparatus ID registered in correspondence with an apparatus name, a station ID, and an apparatus type. Further, the configuration database 37 includes network information having a network ID registered in correspondence with a network name.

Further, the configuration database 37 includes network inside apparatus information having a network ID registered in correspondence with a slot position, a package (PKG) type, and a usage status. Further, the configuration database 37 also has, for example, port information (e.g., soft strap information, facility information) and connection information (e.g., jumper information), and path information registered therein.

FIG. 6 illustrates an example of the monitor database 38 according to an embodiment of the present invention. The monitor database 38 includes journal information having a network ID registered in correspondence with a location (slot position), an occur/recover(/event), an alarm type (e.g., RMBD: missing, LOS: signal loss, SW: switching, cold start), and a time of occurrence.

Further, the monitor database 38 includes an alarm information during occurrence, (currently triggered alarm) having a network ID registered in correspondence with a location, an alarm type, and a time of occurrence. Further, the monitor database 38 includes alarm history information having a network ID registered in correspondence with a location, an alarm type, and a time of occurrence. Further, the monitor database 38 includes system information having a location (e.g., system, server) registered in correspondence with type (e.g., switch operation, execute database backup) and time of occurrence.

FIG. 7 illustrates an exemplary configuration of the temporary database 39 according to an embodiment of the present invention. The items registered in the temporary database 39 are the same as the items of the configuration database 37.

FIG. 8 illustrates an exemplary configuration of the history database 40 according to an embodiment of the present invention. The history database 40 has update information of the server itself registered in correspondence with execution time.

FIG. 9 illustrates an exemplary configuration of the operation configuration management memory 41 according to an embodiment of the present invention. The operation configuration management memory 41 includes information pertaining to the operation status of the server. For example, the operation configuration management memory 41 is registered with the status indicating whether the server itself is a main server or an auxiliary server, the status indicating whether the server itself is an active server or an inactive server, the status of the database (e.g., "master" indicates that the configuration database 37 currently being used, "temporary" indicates that the temporary database 39 is currently being used), and the status indicating whether the server itself is normal/abnormal/currently in the middle of a switching between active and inactive.

FIG. 10 illustrates an exemplary configuration of the update history management memory 42 according to an embodiment of the present invention. The update history management memory 42 includes history information of the server itself having update data registered in correspondence with execution time.

FIG. 11 illustrates an exemplary configuration of the other system update history management memory 43 according to an embodiment of the present invention. The other system update management memory 43 has update information of another server registered in correspondence with execution time.

FIG. 12 illustrates an exemplary configuration of the update history consistency memory 44 according to an embodiment of the present invention. The update history consistency memory 44 has update information of the server itself and update information of another server chronologically registered in correspondence with execution time.

<Operation of Operation System (OpS)>

Figure 13:
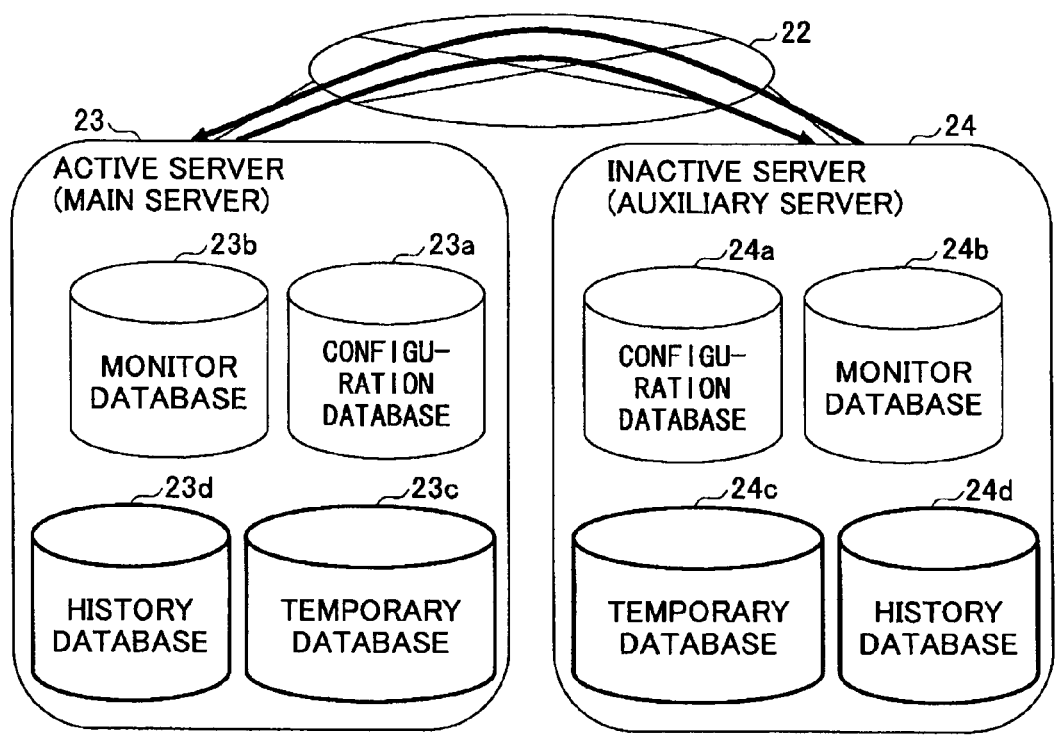
FIG. 13 is a schematic diagram for describing monitoring of a status of an other server according to an embodiment of the present invention.

In a case where operation is normal as illustrated in FIG. 13, the operation configuration manager 34 of the main server 23 transmit an other server status monitor message to the auxiliary server 24 via the other server communicator 32 of the main server 23. The operation configuration manager 34 of the auxiliary server 24 transmits another server status monitor message to the main server via the other server communicator 32 of the auxiliary server 24.

Figure 14:
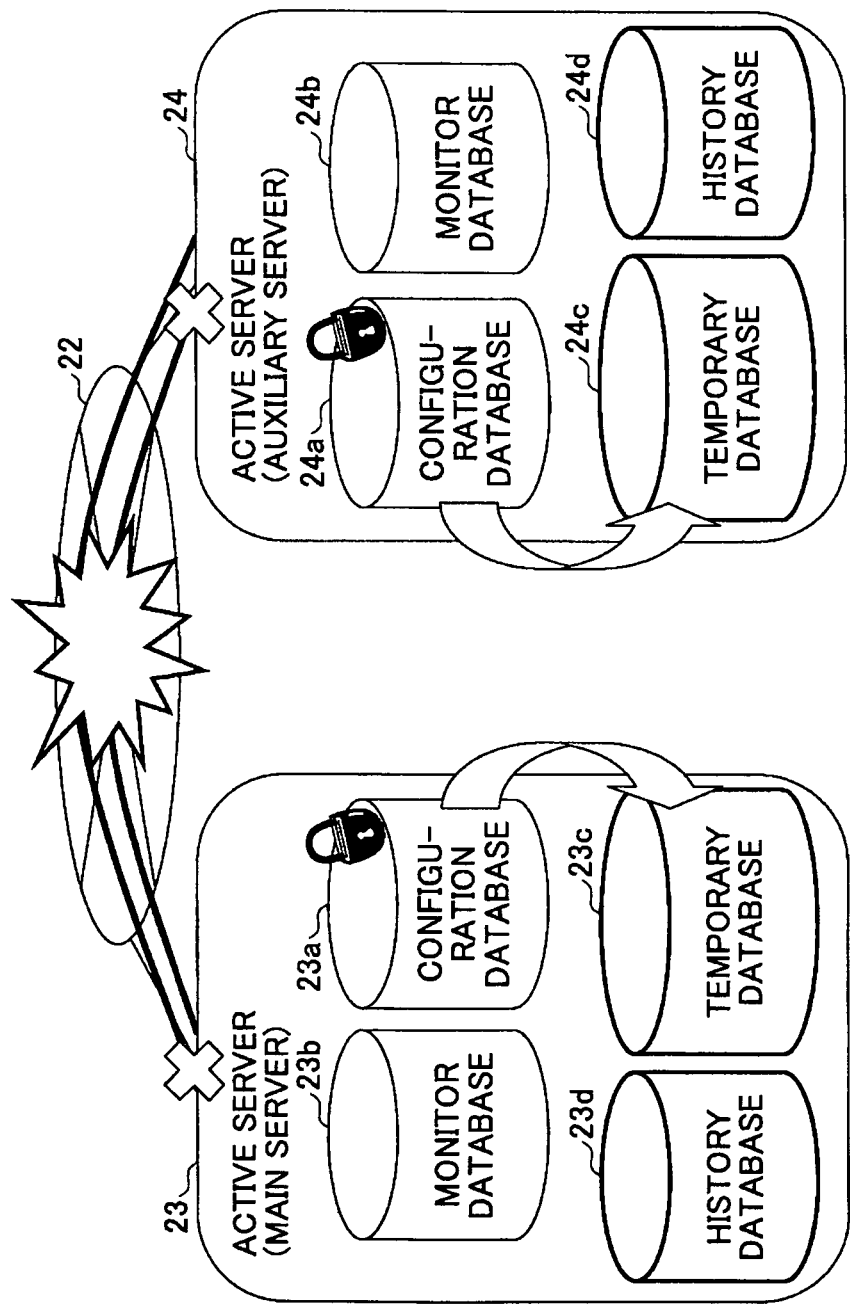
FIG. 14 is a schematic diagram for describing an operation when a failure occurs in a monitor network according to an embodiment of the present invention.

In a case where a failure occurs in the monitor network 22 as illustrated in FIG. 14, each of the main and auxiliary servers 23, 24 determines that the status of the other server is abnormal when a response to the status monitor message is not received from the other server for a predetermined number of times within a predetermined period.

In such a case where abnormality is determined, each of the main and auxiliary servers 23, 24 locks the configuration database 37 while retaining update transactions (update prevented state being illustrated with a lock in FIG. 14), copies the data contents of the configuration database 37 to the temporary database 39, and sets the database status of the operation configuration management memory 41 to an abnormal state. Further, the auxiliary server 24 sets the item "active/inactive" to "active" in the operation configuration management memory 41.

This is to prevent data update transactions from accumulating in the main and auxiliary servers 23, 24 and causing a deadlock of data in a case where the replication function of the configuration database 37 is used.

Accordingly, the database access manager 33 performs data referral and data update on the temporary database 39. The data changed by the database access manager 33 (e.g., updated data) are retained in the history database 40. The monitor database 38 is managed by a single server regardless of the status of the main and auxiliary servers 23, 24.

In a case of failure (abnormal state), the operation configuration manager 34 of the main server 23 transmits an other server status monitor message to the auxiliary server 24 via the other server communicator 32 as illustrated with an arrow S1 in FIG. 15.

In a case of recovery from the failure, it becomes possible for the main server 23 to receive a response to the status monitor message from the auxiliary server 24. When the main server 23 receives the response from the auxiliary server 24, the main server 23 determines that the operation system has recovered and transmits an operation configuration change notice to the auxiliary server 24 (illustrated with arrow S2 in FIG. 15).

When the operation configuration manager 34 of the auxiliary server 24 receives the operation configuration change notice via the other server communicator 32 of the auxiliary server 24, the auxiliary server 24 sets the database status to "currently switching (currently operating)" and locks the temporary database 39 and the history database 40. Then, the auxiliary server 24 transmits an operation configuration change possible notice to the main server 23 (illustrated with arrow S3 in FIG. 15).

When the operation configuration manager 34 of the main server 23 receives the operation configuration change possible notice via the other server communicator 32 of the main server 23, the main server 23 sets the database status of the operation configuration management memory 41 to "currently switching" and locks the temporary database 39 and the history database 40. Then, the main server 23 transmits an operation configuration change execution notice (i.e. request for transmitting update history information) to the auxiliary server 24 (illustrated with arrow S4 in FIG. 15).

Then, as illustrated in FIG. 16, when the operation configuration manager 34 of the auxiliary server 24 receives the operation configuration change execution notice via the other server communicator 32 of the auxiliary server 24, the operation configuration manager 34 reads out information from the history database 40 (24d) via the database access manager 33 and loads the read out information to the update history management memory 42. Then, the auxiliary server 24 transmits the information in the update history management memory 42 to the main server 23.

Then, as illustrated in FIG. 17, when the operation configuration manager 34 of the main server 23 receives the update history information from the auxiliary server 24 via the other server communicator 32, the operation configuration manager 34 loads the update history information to the other server update history management memory 43. After the operation configuration manager 34 of the other server 24 completes transmitting all of the update history information to the main server 23 via the other server communicator 32 of the other server 24, the other server 24 changes the operation status of the operation configuration management memory 41 to "inactive server", changes the database status to "normal", and transmits an operation configuration change completion notice to the main server 23. At this point, the auxiliary server 24 is in a normal status where the auxiliary server 24 is operated according to the configuration database 37 and the monitor database 38.

When the operation configuration manager 34 of the main server 23 receives the operation configuration change completion notice via the other server communicator 32 of the main server 23, the operation configuration manager 34 of the main server 23 reads out information from the history database 40 via the database access manager 33 and loads the read out information to the update history management memory 42. Then, the operation configuration manager 34 merges the data in the update history management memory and the information in the other system update history management memory 43 in chronological order and loads the merged information to the update history consistency memory 44.

Figure 18:
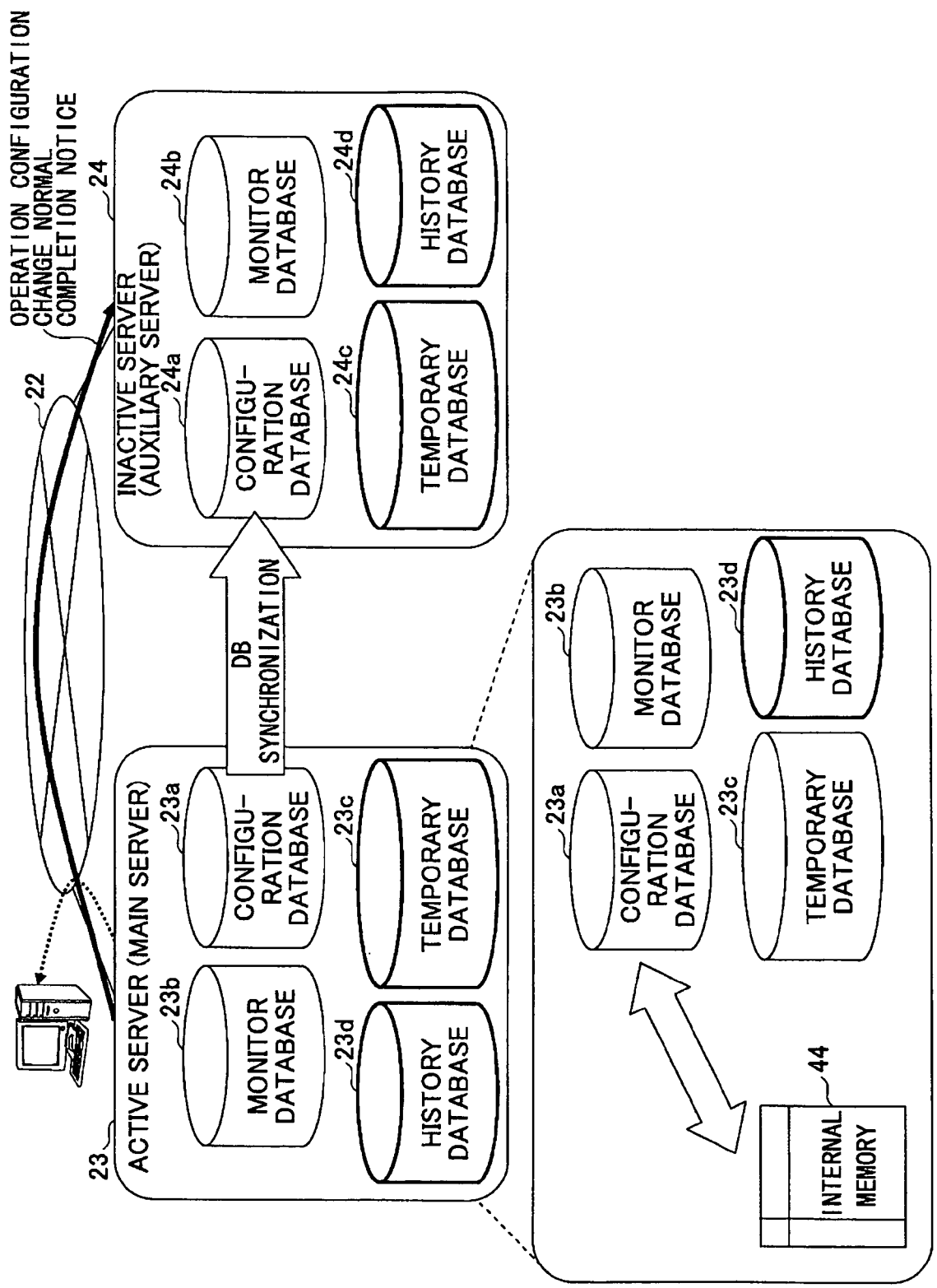

As illustrated in FIG. 18, the operation configuration manager 34 of the main server 23 updates the configuration database 37 based on the information in the update history consistency memory 44 via the other server communicator 32 of the main server 23. When the configuration database 37 of the main server 23 is updated, the auxiliary server 24 is also updated in which the configuration database 37 of the auxiliary server 24 is synchronized with the configuration database 37 of the main server 23 owing to the replication function of the configuration database 27 of the auxiliary server 24. Transactions prior to the abnormal state are transferred to the auxiliary server 24.

After all the information in the update history consistency memory 44 are reflected (registered) in the configuration database 23a (37) of the main server 23, the database status of the operation configuration management memory 41 is changed to "normal", and the main server 23 shifts to a normal status.

In returning to the normal status, the main server 23 transmits the operation configuration change normal completion notice to the auxiliary server 24 and reports a normal operation event to an administrator via the client communicator 31. Further, in the case of updating the configuration database 23a (37) of the main server 23 by reflecting (registering) the information of the update history consistency memory 44 to the configuration database 23a (37) of the main server 23, error information is reported to the administrator via the client communicator 31 when an inconsistency (mismatch) of the update information occurs (e.g., mismatch in updating deleted data).

<Flowchart of Operation System (OpS)

Figure 19:
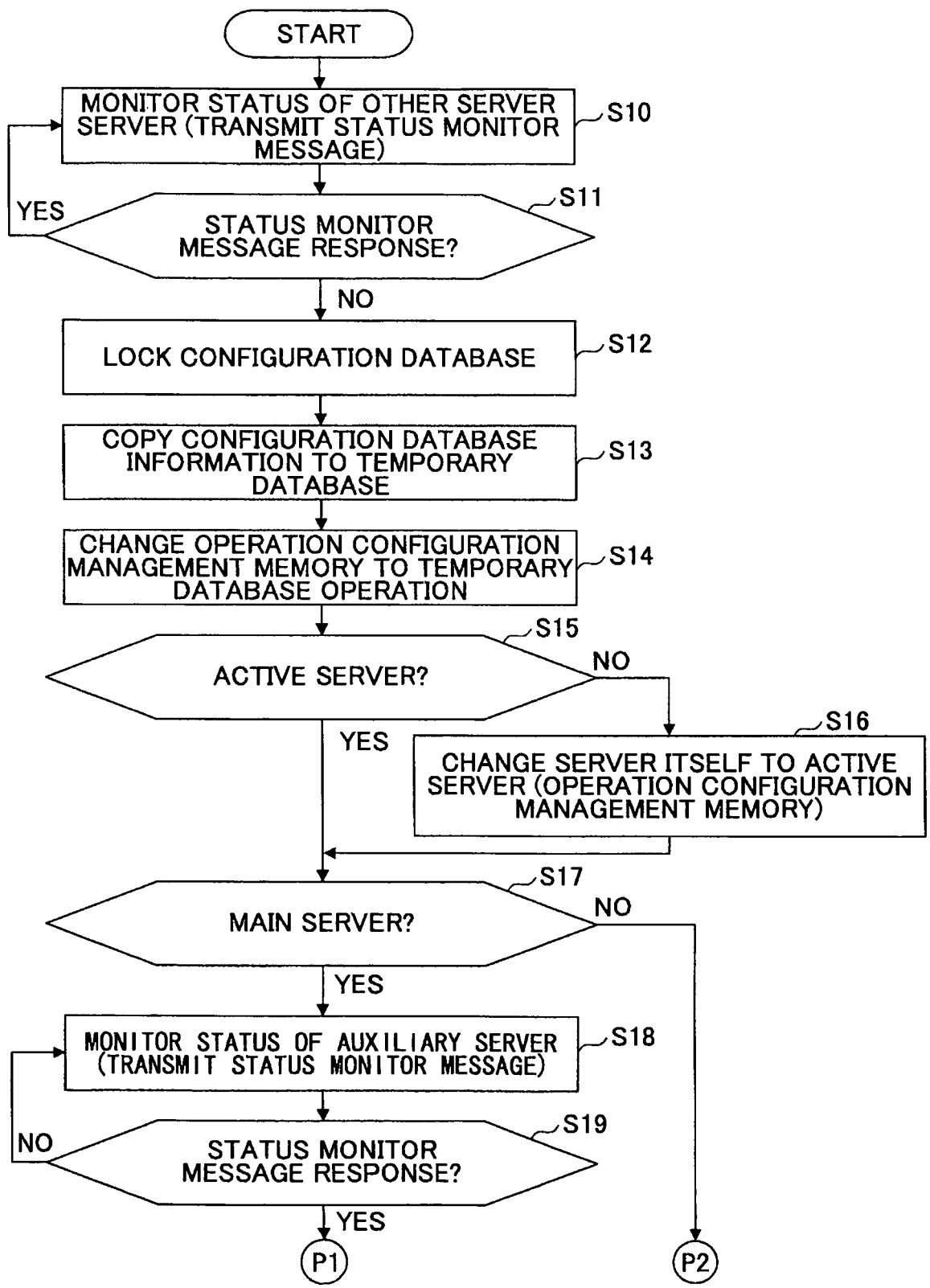
FIGS. 19-21 are flowcharts illustrating processes executed by an operation system according to an embodiment of the present invention.
Figure 20:
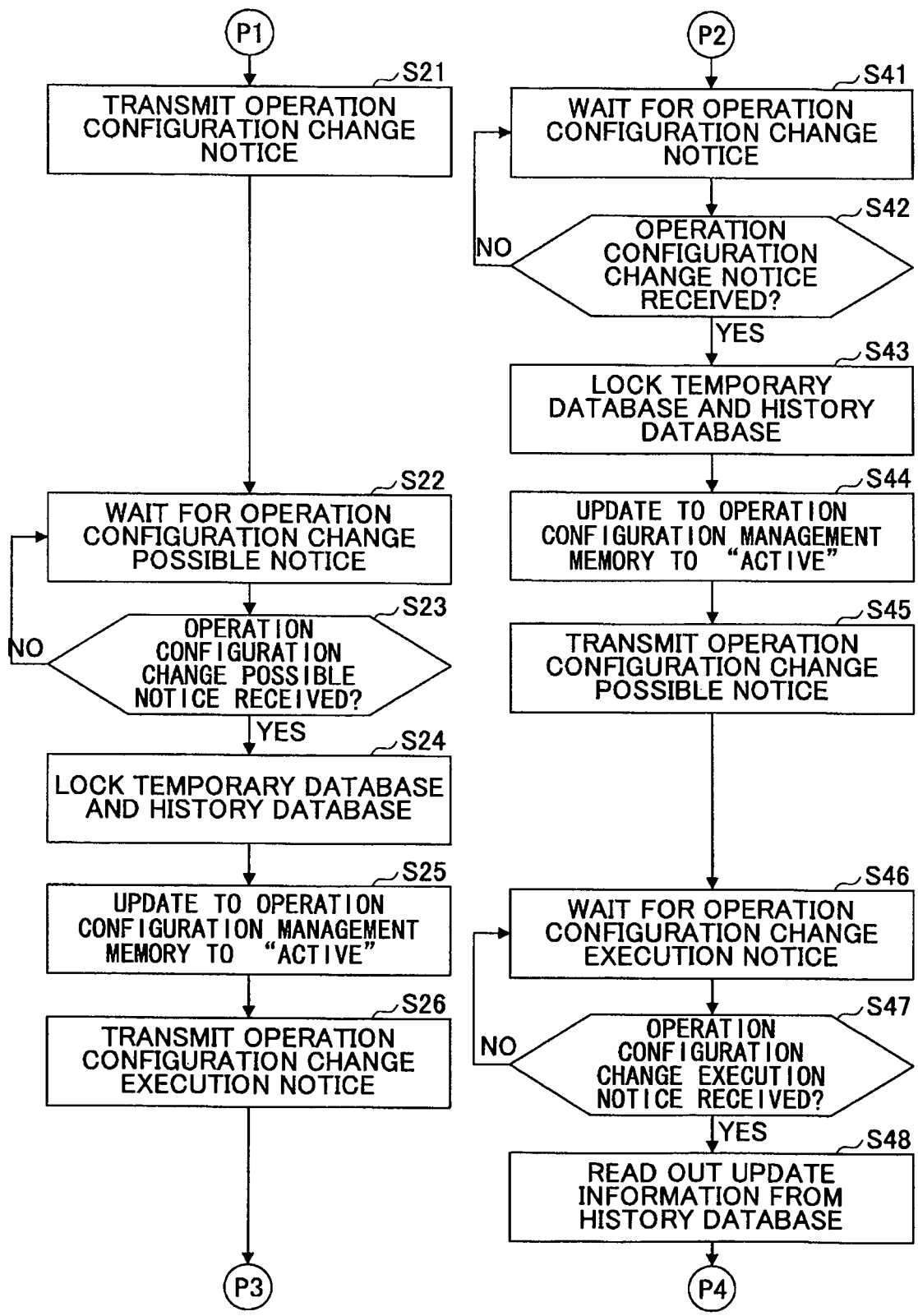
Figure 21:
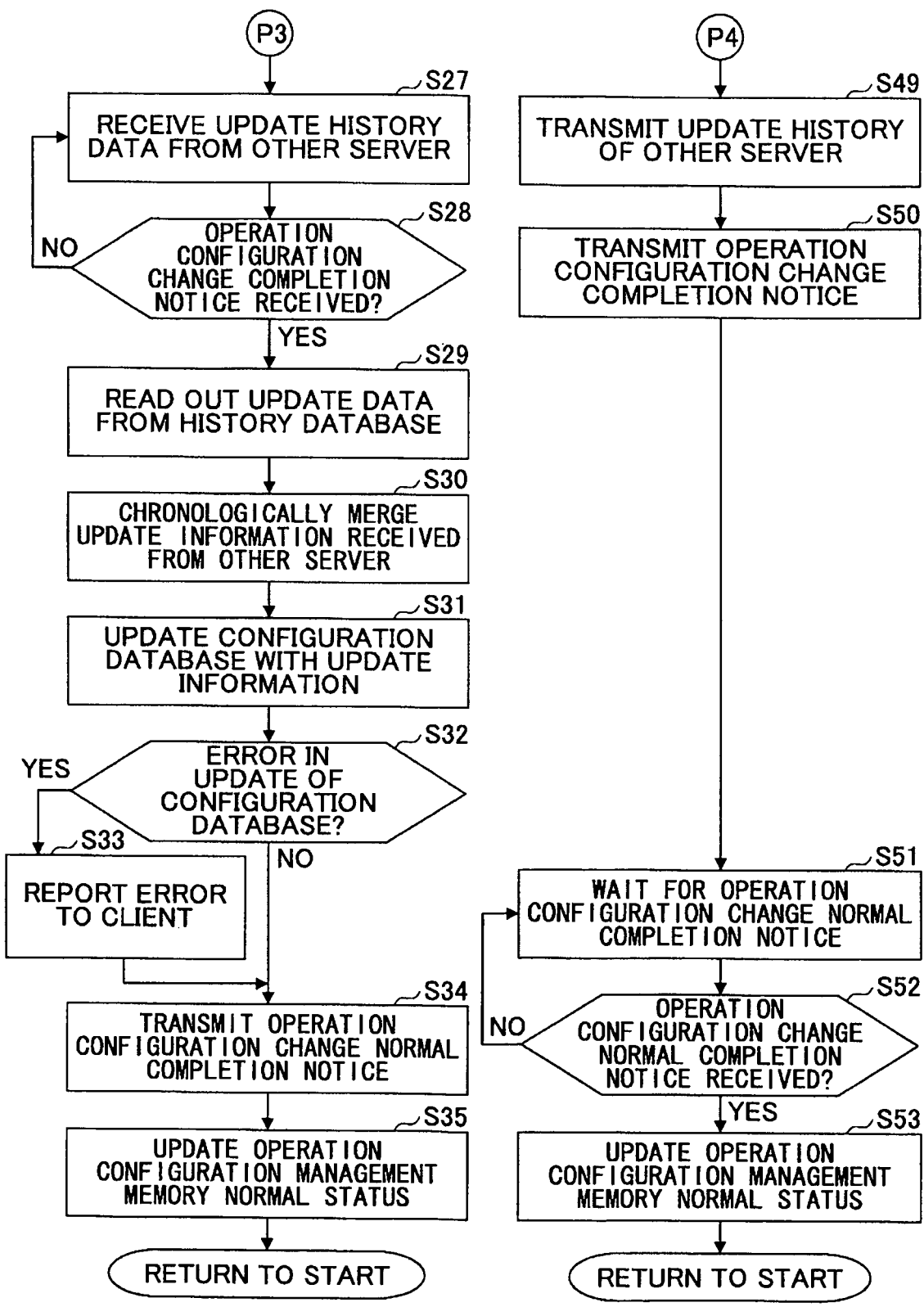

FIGS. 19 to 21 are flowcharts illustrating processes executed by an operation system including at least one of the main server 23 and the auxiliary server 24 according to an embodiment of the present invention. In step S10 of FIG. 19, a server (the main server 23 or the auxiliary server 24) transmits a status monitor message to another server. Then, in step S11, the server determines whether a response to the status monitor message is not consecutively received from the other server for a predetermined number of times within a predetermined period.

In a case where the response to the status monitor message is not consecutively received from the other server for a predetermined number of times within a predetermined period (No in Step S11), the server locks the configuration database 37 in Step S12.

In Step S13, the server copies the data (data contents) of the configuration database 12 to the temporary database 39. Further, in Step S14, the server changes the database status of the operation configuration management memory 41 to "temporary" so that the temporary database 39 is operational (active).

Then, in Step S15, the server determines whether the server itself is an active server by referring to the settings in the operation configuration management memory 41. In a case where the server itself is an inactive server (No in Step S15), the server changes (switches) itself to an active server in Step S16. This change is performed in the operation configuration management memory 41.

Further, in Step S17, the server determines whether the server itself is a main server by referring to the settings in the operation configuration management memory 41. In a case where the server itself is a main server 23 (Yes in Step S17), the server transmits a status monitor message to the auxiliary server 24 in Step S18. Then, the server (main server 23) determines whether a response to the status monitor message (i.e. status monitor message response) is received from the auxiliary server 24 within a predetermined period in Step S19. In a case where the status monitor message response is received within the predetermined period, the operation illustrated in FIG. 19 proceeds to Step S21 of FIG. 20.

On the other hand, in a case where the server itself is an auxiliary server 24, the operation illustrated in FIG. 19 proceeds to Step S41 of FIG. 20.

In Step S21, the main server 23 transmits an operation configuration change notice to the auxiliary server 24. Then, in Step S22, the main server 23 waits to receive an operation configuration change possible notice. Then, in Step S23, the operation proceeds to Step S24 when the main server 23 determines that the operation configuration change possible notice is received.

In Step S24, the main server 23 locks the temporary database 39 and the history database 40. In Step S25, the main server 23 sets (updates) the database status of the operation configuration management memory 41 to "active". Then, in Step S26, the main server 23 requests the auxiliary server 24 to transmit update history information by transmitting an operation configuration change execution notice to the auxiliary server 24. After the operation configuration change execution notice is transmitted, the operation of FIG. 20 proceeds to Step 27 of FIG. 21.

In Step S41, the auxiliary server 24 waits to receive an operation configuration change possible notice from the main server 23. Then, the operation proceeds to Step S43 when the auxiliary server 24 determines that the operation configuration change possible notice is received (Yes in Step S42).

In Step S43, the auxiliary server 24 locks the temporary database 39 and the history database 40. Then, in Step S44, the auxiliary server 24 sets (updates) the database status of the operation configuration management memory 41 to "active". Then, the auxiliary server 24 transmits an operation configuration change execution notice to the main server 23 in Step S45.

Then, the auxiliary system server 24 waits to receive operation configuration change possible notice in Step S47. Then, in a case where the auxiliary server 24 determines that the operation configuration change execution notice is received (Yes in Step S47), the operation proceeds to Step S48. In Step S48, the auxiliary server 24 reads out information from the history database 40. After information is read out from the history database 40, the operation of FIG. 20 proceeds to Step S49 of FIG. 21.

In Step S27 of FIG. 21, the main server 23 receives update history data from the other server. In Step S28, the main server 23 determines whether an operation configuration change completion notice is received. The main server 23 continues to receive update history data in Step S27 until the operation configuration change completion notice is received. In Step S29, the main server 23 reads out information from the history database 40.

Then, in Step S30, the main server 23 merges the update information read out from the update database 40 of the main server 23 with the update information read out from the history database 40 of the auxiliary server 24 and transmitted from the auxiliary server 24. The update information read out from the update database 40 of the main server 23 and the update information read out from the update database 40 of the auxiliary server 24 are merged in chronological order. Then, in Step S31, the main server 23 registers (reflects) the merged update information to the configuration database 37. In other words, the configuration database 37 is updated. When the configuration database 37 of the main server 23 is updated, the configuration database 37 of the auxiliary server 24 is also updated by the replication function of the configuration database 37 of the auxiliary server 24 that synchronizes with the configuration database 37 of the main server 23.

Then, in Step S32, the main server 23 determines whether there is any error in the updated configuration database 37 of the main server 23. In a case where there is an error (e.g., updating of data which should have been deleted), the main server 23 reports the error to a part of or all of the clients 21-1 to 21-m.

Then, in Step S34, the main server 23 transmits a message to the auxiliary server 24 indicating the completion of the update (active configuration change normal completion notice). Then, in Step S35, the main server 23 updates the database status of the operation configuration management memory 41 to a "normal status". After the database status is updated to "normal status", the operation illustrated in FIG. 21 returns to step S10 of FIG. 19.

In Step S49 of FIG. 21, the auxiliary server 24 transmits information read out from the history database 40 to the main server 23. After the auxiliary server 24 transmits all of the update history data, the auxiliary server 24 transmits a message to the main server 23 indicating the completion of an active configuration changing process in Step S50 (active configuration change completion notice).

Then, the auxiliary server 24 waits to receive the active configuration change normal completion notice from the main server 23 in Step S51. In a case where the auxiliary server 24 determines that the active configuration change normal completion notice is received (Yes in Step S52), the auxiliary server 24 updates the database status of the operation configuration management memory 41 to a "normal status" in Step S53. After the database status is updated to "normal status", the operation illustrated in FIG. 21 returns to step S10 of FIG. 19.

Accordingly, even in a case where a failure occurs in the active main server 23 due to, for example, hardware malfunction or application failure or a case where the active main server 23 cannot be accessed, the main server 23 and the auxiliary server 24 can retain their configuration databases 37 that are merged and synchronized with each other. Further, by using the temporary database 39 to which the data in the configuration data 37 are copied (duplicated), the inactive auxiliary server 24 can be immediately switched to an active type server. Further, updating of the temporary database 39 can be allowed.

With the above-described embodiment of the present invention, consistency between the configuration database 37 of the main server 23 and the configuration database 37 of the auxiliary server 24 can be maintained while both the main and auxiliary servers 23, 24 are allowed to be active servers instead of having one of the main and auxiliary servers 23, 24 being inactive and being allowed to only perform monitoring.

By storing updated data of the temporary database 39 in the history database 40, updated data in the history database 40 can be reflected (registered) to the configuration database 37 of the main server 23 being the initial active server after the recovery of the main and auxiliary servers 23, 24 and the recovery of communications. Accordingly, updated data from each of the main and auxiliary servers 23, 24 can be reflected (registered) to the configuration databases 37 of the main and auxiliary servers 23, 24 even in a case where there is an abnormality in the operation system. Thus, consistency between the configuration databases 37 of the main and auxiliary servers 23, 24 of the operation system (OpS) can be maintained in a manner in which the updated data during the abnormality can be reflected (registered) to the configuration databases 37 of the main and auxiliary servers 23, 24.

In the above-described embodiment of the present invention, update history data of the auxiliary server 24 is transmitted to the main server 23 upon recovery and the main server 23 updates the configuration database 37 of the main server 23 by merging the update data of the main server 23 and the update data of the auxiliary server 24. Alternatively, however, update history data of the main server 23 may be transmitted to the auxiliary server 24 upon recovery and the auxiliary server 24 may update the configuration database 37 of the auxiliary server 24 by merging the update data of the main server 23 and the update data of the auxiliary server 24.

In the above-described embodiment of the present invention, the configuration database 37 may be referred to as a configuration data storage part, the monitor database 38 may be referred to as a monitor data storage part, the other server communicator 32 may be referred to as another server monitor part, the temporary database 39 may be referred to as a temporary storage part, the history database 40 may be referred to as a history storage part, the operation configuration manager 34 may be referred to as a configuration data update part and an active server switching part.

Hence, with the above-described embodiments of the present invention, operating limitations can be reduced in a case where an active server cannot be accessed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server of an operation system to monitor and control at least one transmission apparatus of a network, the server comprising:
    a monitor to monitor a status of another server;
    a first storage to retain a first network configuration information;
    a second storage to copy the first network configuration information and use the copied first network configuration information to monitor and control the transmission apparatus when the monitor detects an abnormality in the another server;
    a third storage to retain a first update history information including update information of a network configuration information obtained from a client in the operation system; and
    an operation configuration manager to update the first network configuration information and a second network configuration information retained in the another server when the another server recovers from the abnormality,
    wherein the operation configuration manager is configured to update the first network configuration information and the second network configuration information based on the first update history information and a second update history information retained in the another server,
    wherein the server and the another server are configured to control and monitor the transmission apparatus separately, and
    wherein the server and the another server include configuration databases that synchronize with each other.

2. The server as claimed in claim 1, wherein the operation configuration manager is configured to switch an operation status of the server when the abnormality is detected in the another server in a case where the operation status of the server is inactive.

3. The server as claimed in claim 2, wherein the operation configuration manager is configured to request the another server to transmit the second update history information, merge the first and second update history information in a chronological order, and update the first network configuration information with the merged first and second update history information.

4. The server as claimed in claim 3, wherein the operation configuration manager is configured to report an error to one or more clients in the operation system when the error occurs during the updating of the first network configuration information of the server based on the first update history information.

5. The server as claimed in claim 4, wherein the operation configuration manager is configured to switch the operation status of the server in a case where the operation status of the server is inactive after transmitting the first update history information to the another server in response to a request from the another server.

6. A method to manage data of an operation system which monitors and controls at least one transmission apparatus of a network, the method comprising:
    retaining a first network configuration information in a first configuration storage of a main server and a second network configuration information in a second configuration storage of an auxiliary server while maintaining synchronization between the first and second configuration storages;
    retaining a first monitor information in a first monitor information storage of the main server and a second monitor information in a second monitor information storage of the auxiliary server;
    monitoring a status of another server with a first monitor of the main server and a second monitor of the auxiliary server;
    copying the first network configuration information and the second network configuration information and using the copied first network configuration information to monitor and control the transmission apparatus when an abnormality is detected in the another server in the monitoring;
    retaining a first update history information in a first history storage of the main server and a second update history in a second history storage of the auxiliary server, the first and second update history including update information of a network configuration information obtained from a client in the operation system; and
    updating the first and second configuration information when the another server recovers from the abnormality,
    wherein the updating is based on the first and second update history information of the main and auxiliary servers,
    wherein the server and the another server are configured to control and monitor the transmission apparatus separately, and
    wherein the server and the another server include configuration databases that synchronize with each other.

7. The method as claimed in claim 6, further comprising:
    switching an operation status of the main server when the abnormality is detected in the another server in a case where the operation status of the main server is inactive.

8. The method as claimed in claim 7, wherein the updating includes requesting the another server to transmit the second update history information, merging the first and second update history information in a chronological order, and updating the first network configuration information with the merged first and second update history information.

9. The method as claimed in claim 8, wherein the updating includes reporting an error to one or more clients in the operation system when the error occurs during the updating of the first network configuration information of the main server based on the first update history information.

10. The method as claimed in claim 9, wherein the switching includes switching the operation status of the main server in a case where the operation status of the main server is inactive after transmitting the first update history information to the another server in response to a request from the another server.

* * * * *